United States Patent
Arnold

(10) Patent No.: US 10,183,738 B2
(45) Date of Patent: Jan. 22, 2019

(54) FLIGHT CONTROL AUGMENTATION SYSTEM AND METHOD FOR HIGH ASPECT RATIO AIRCRAFT INCLUDING MOTORGLIDER AIRCRAFT, OPTIONALLY PILOTED VEHICLES (OPVS) AND UNPILOTED AIR VEHICLES (UAVS)

(71) Applicant: Marc Arnold, Longmont, CO (US)

(72) Inventor: Marc Arnold, Longmont, CO (US)

(*) Notice: Subject to any disclaimer, the term of this patent is extended or adjusted under 35 U.S.C. 154(b) by 785 days.

(21) Appl. No.: 14/677,512

(22) Filed: Apr. 2, 2015

(65) Prior Publication Data

US 2016/0318601 A1 Nov. 3, 2016

Related U.S. Application Data

(60) Provisional application No. 61/976,500, filed on Apr. 8, 2014.

(51) Int. Cl.
| | |
|---|---|
| *B64C 13/28* | (2006.01) |
| *B64C 9/12* | (2006.01) |
| *B64C 13/16* | (2006.01) |
| *B64C 19/02* | (2006.01) |
| *B64C 9/10* | (2006.01) |

(Continued)

(52) U.S. Cl.
CPC .............. *B64C 13/28* (2013.01); *B64C 9/10* (2013.01); *B64C 9/12* (2013.01); *B64C 9/18* (2013.01); *B64C 9/20* (2013.01); *B64C 13/04* (2013.01); *B64C 13/16* (2013.01); *B64C 19/02* (2013.01); *B64C 39/024* (2013.01); *G05D 1/0661* (2013.01); *G05D 1/0676* (2013.01); *B64C 2009/005* (2013.01); *B64C 2201/141* (2013.01); *Y02T 50/32* (2013.01); *Y02T 50/44* (2013.01)

(58) Field of Classification Search
CPC .. B64C 13/28; B64C 9/10; B64C 9/18; B64C 9/20; B64C 13/04; B64C 39/024; B64C 9/12; B64C 19/02; B64C 13/16; B64C 2201/141; B64C 2009/005; G05D 1/0676; G05D 1/0661; Y02T 50/32; Y02T 50/44
See application file for complete search history.

(56) References Cited

U.S. PATENT DOCUMENTS

| | | | | |
|---|---|---|---|---|
| 4,363,098 A | * | 12/1982 | Buus | G05D 1/0808 244/175 |
| 6,561,463 B1 | * | 5/2003 | Yount | B64C 9/12 244/196 |

(Continued)

*Primary Examiner* — Assres H Woldemaryam
(74) *Attorney, Agent, or Firm* — Lathrop Gage LLP

(57) ABSTRACT

A control augmentation system for high aspect ratio aircraft has aileron/flaperon and throttle position sensors; spoiler and flap controls; a mode switch with manual, and landing modes; and a controller driving left and right spoiler and flap servos, the controller including at least one processor with memory containing firmware configured to: when the mode switch is in manual mode, drive both spoiler servos to a symmetrical position according to the spoiler control; when the mode switch is in landing mode, drive the left spoiler to a position dependent on aileron and throttle position, and the right spoiler to a position dependent on aileron and throttle position, the left and right spoiler positions differing whenever ailerons are not centered, and an average of spoiler positions is more fully deployed when the throttle position is at a low-power setting than when the throttle position is at a high-power setting.

9 Claims, 5 Drawing Sheets

(51) Int. Cl.
*B64C 9/18* (2006.01)
*B64C 9/20* (2006.01)
*B64C 13/04* (2006.01)
*B64C 39/02* (2006.01)
*G05D 1/06* (2006.01)
*B64C 9/00* (2006.01)

(56) References Cited

U.S. PATENT DOCUMENTS

| | | | |
|---|---|---|---|
| 8,718,839 B2 * | 5/2014 | Everett | B64C 13/08 244/178 |
| 2005/0173595 A1 * | 8/2005 | Hoh | B64C 13/04 244/223 |
| 2014/0239126 A1 * | 8/2014 | Hara | B64C 13/16 244/203 |
| 2015/0028162 A1 * | 1/2015 | Wildschek | B64C 13/16 244/76 C |
| 2015/0314855 A1 * | 11/2015 | Luszcz | B64C 27/72 701/3 |
| 2016/0194074 A1 * | 7/2016 | Hagerott | B64C 13/16 701/5 |

\* cited by examiner

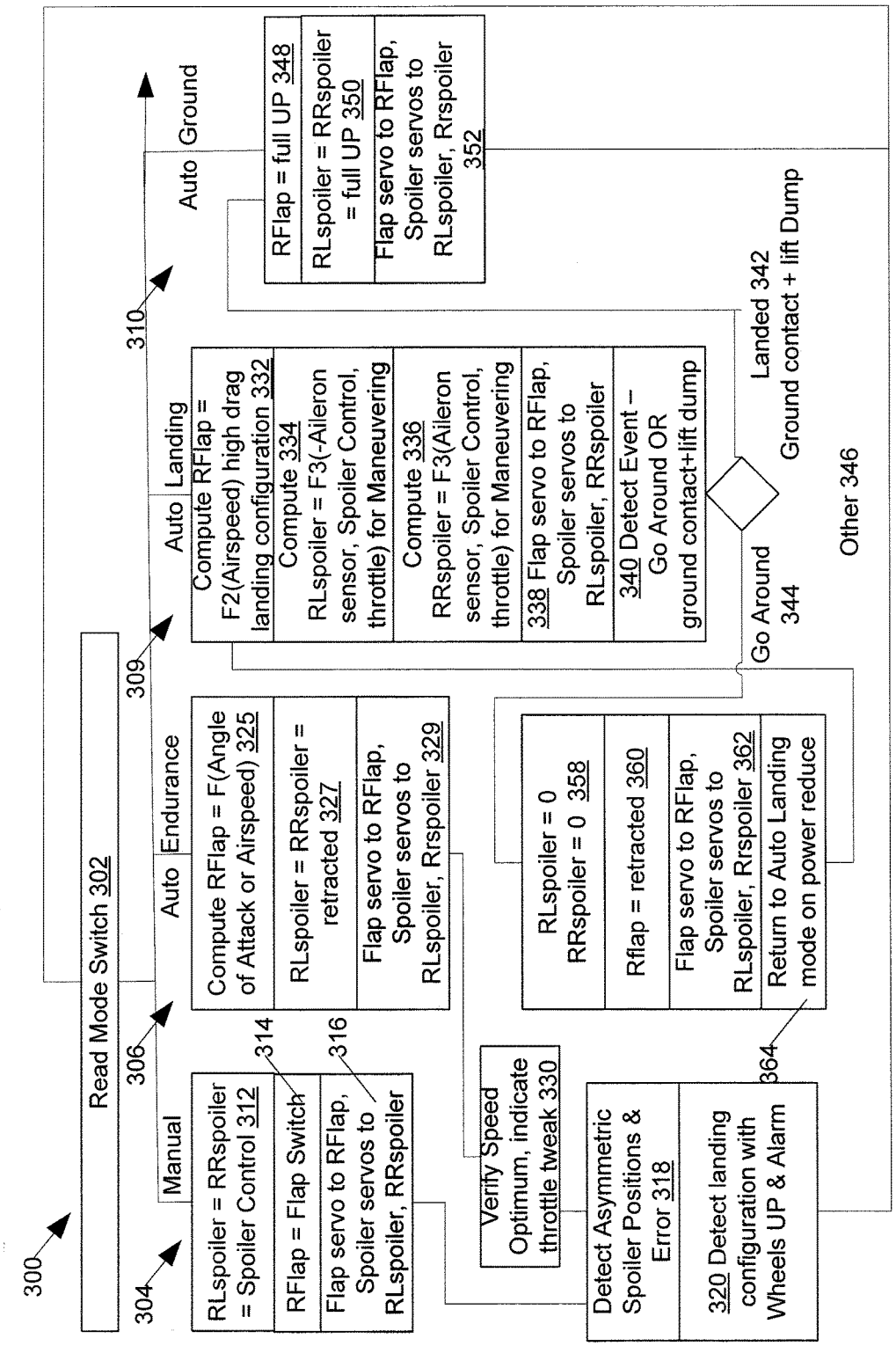
Fig. 3 Flowchart

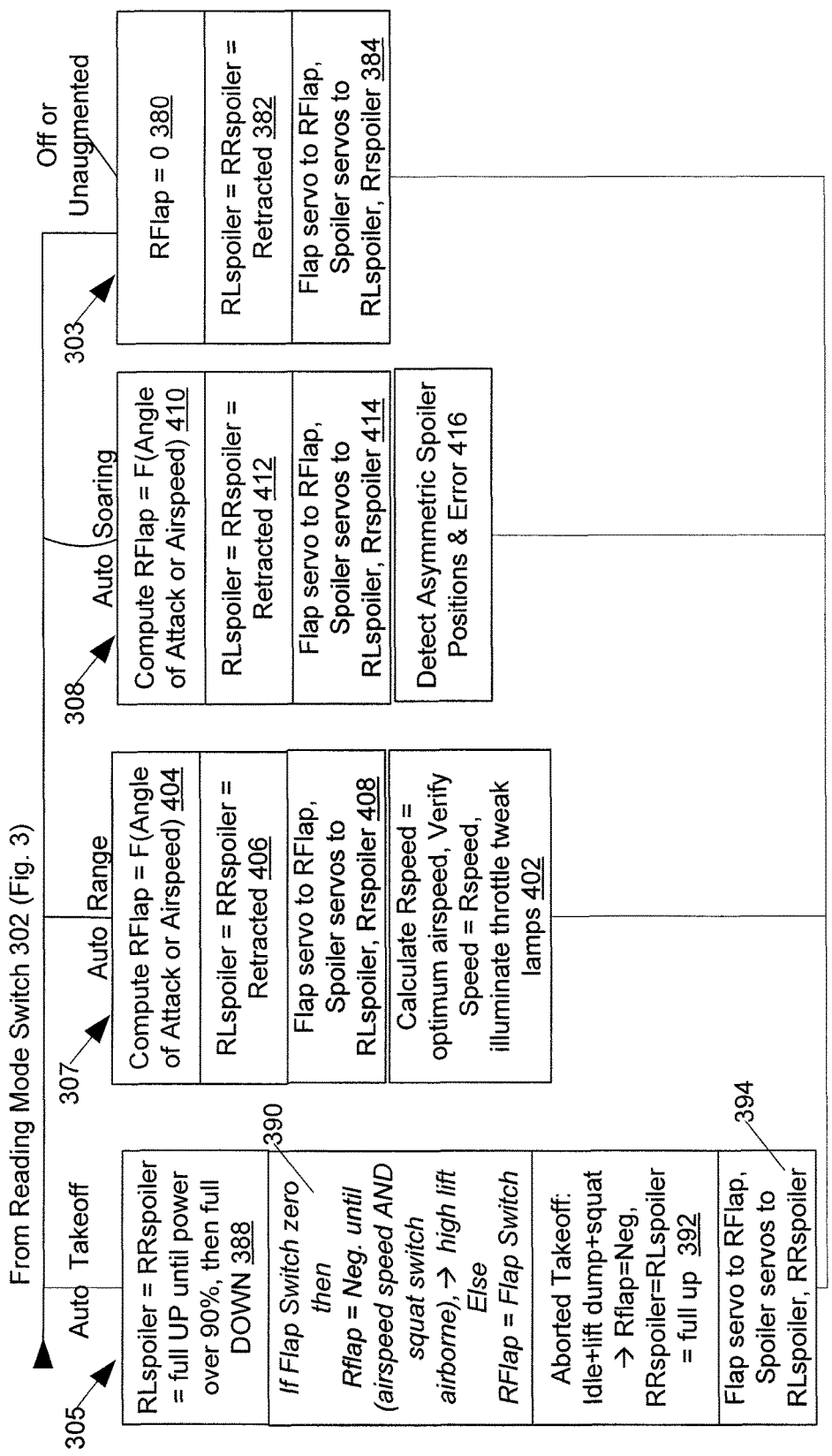
Fig. 3A Flowchart Continued

FLIGHT CONTROL AUGMENTATION SYSTEM AND METHOD FOR HIGH ASPECT RATIO AIRCRAFT INCLUDING MOTORGLIDER AIRCRAFT, OPTIONALLY PILOTED VEHICLES (OPVS) AND UNPILOTED AIR VEHICLES (UAVS)

PRIORITY CLAIM

The present document claims priority to U.S. Provisional patent application 61/976,500 filed 8 Apr. 2014.

BACKGROUND

High aspect ratio aircraft including light motorglider aircraft, long-endurance unpiloted air vehicles (UAVs), and long-endurance optionally piloted vehicles (OPV's) have become increasingly popular for sport and utility applications. These aircraft share a characteristic long, narrow, wing capable of generating significant lift at low airspeeds. Being aerodynamically efficient, these vehicles are well suited for long duration flight, either by soaring engine off, or by operation of fuel efficient engines. These are referred to herein as high aspect ratio aircraft.

PRIOR ART FIG. 1 is provided not for limitation, but to illustrate key features common to most high aspect ratio aircraft 100, such as most motorgliders. The wings 102 of motorgliders are typically equipped with ailerons 104, used for roll control and steering. Inboard of ailerons 104 are flaps 106, typically provided to increase lift at low airspeeds and typically configured such that the flaps 106 of both wings operate simultaneously so as to not interfere with roll control or steering. In some motorgliders, the functions of flaps and ailerons are combined into a flaperon surface on each wing, where common deflection performs the function of flaps, and opposing deflection performs the function of ailerons.

Since motorgliders 100 typically have very low drag, with glide ratios of as much as sixty to one; retractable spoilers 108 or air-brakes are provided that, when deployed, increase drag and reduce lift, thereby steepening glide to facilitate landing. Typically, the spoilers of both wings are coupled together such that they deploy simultaneously and do not interfere with roll control or steering.

A horizontal stabilizer 110 is also typically provided, with an elevator 112 configured to provide pitch control, and a vertical stabilizer 114 equipped with movable rudder 116 for yaw control and steering.

Typical motorgliders are also equipped with a propeller 118 that is coupled to an engine and configured so that propeller drag may be reduced when the engine is not operating; various models are configured for drag reduction by retraction of the propeller into a nosecone, retraction of propeller along with a pylon-mounted engine, or by feathering the propeller. The engine is typically configured such that it is usable to launch and fly the motorglider to areas of rising air may be found, such as may result from thermal activity or from the interaction of wind with steep terrain. The engine is also typically configured to be shut down during flight, and restarted during flight.

For landing and takeoff, landing gear with one or more wheels 120 are typically provided, in many motorgliders one or more of wheels 120 are retractable to reduce drag. In some embodiments, these are in tricycle configuration with a forward nosewheel and two main-gear wheels located aft of a center of gravity, in other embodiments they are in conventional configuration with two main-gear wheels located forward of center of gravity and a tailwheel, and in yet other embodiments they are arranged with a central main wheel and smaller wingtip and tail wheels as are often used on gliders. Since common causes of damage to retractable-gear aircraft include wheels-up landings and premature retraction at takeoff, wheels 120, if retractable, are typically equipped with a "weight on wheels" or "squat switch" sensor to detect ground contact, typically sensing weight on wheels 120 and prevent retraction while on the ground; and with both gear-down sensors and gear-up sensors that are coupled to indicators in cockpit 122. In some embodiments, separate gear-down sensors and gear-up sensors are provided for each wheel 120.

Since wings 102 of motorglider and other high aspect ratio aircraft are long relative to typical powered aircraft of similar weight and height, some flight maneuvers commonly performed in typical powered aircraft are difficult, if not impossible, to perform in motorgliders. For example, a typical powered aircraft may perforin a "slip" while making a crosswind landing on a runway, lowering the upwind wing and permitting the aircraft to keep its longitudinal axis 124 better aligned with the runway than otherwise possible. With a long-winged motorglider, a "slip" during landing may cause the wingtip to impact the ground before wheels 120 reach the runway. Similarly, use of ailerons 104 on long wings to turn the aircraft cause more adverse yawing movements than those encountered with typical powered aircraft. Further, the low stall speed helpful in riding thermals makes motorgliders far more vulnerable than conventional light aircraft to unintended liftoff or loss of control in gusty conditions during takeoff, landing and ground operations.

Typical light aircraft use flaps to increase drag and lift for takeoff and landing, while at all other times the flaps remain fully retracted. The pilots of motorgliders, however, use different flap settings from reflex (negative or upward) deflection for high speed flight between thermals to positive (downward) deflection settings to optimize the wing profile for slower speeds while in thermalling flight. Timely and accurate application of flaps 106 adapts the wing and significantly improves a motorglider's performance. Given the limited number of discrete flap positions, the pilot of a traditional motorglider must accept an approximate setting and can never set the perfect flap setting which may lie between one of the preset flap settings.

SUMMARY

In an embodiment, a control augmentation system for high aspect ratio aircraft has left spoiler, right spoiler, and flap servos, aileron or flaperon and throttle position sensors; spoiler and flap controls; a mode switch with a manual and landing modes; and a controller driving the spoiler and flap servos, the controller has a processor with memory, the memory having firmware with machine readable instructions configured to: when the mode switch is in the manual modes, sense the spoiler control and drive both spoiler servos to a symmetrical position determined by the spoiler control; when the mode switch is in the landing mode, drive the left spoiler servo to a left spoiler position dependent on aileron and throttle position, and the right spoiler servo to a right spoiler position dependent on aileron and throttle position, the left and right spoiler positions differing whenever ailerons are not centered, and an average of the spoiler positions being more fully deployed when the throttle position is at a low-power than when the throttle position is at high-power.

In another embodiment, a control augmentation system adapted for use in high aspect ratio aircraft includes left spoiler, right spoiler, and flap or flaperon, servo drivers; aileron and throttle position sensors; a spoiler control input and a flap selector input; and a mode switch having at least an auto-takeoff mode. The system has a controller coupled to control the spoiler and flap servos, the controller coupled to the aileron and throttle position sensors and the mode switch, and including at least one processor having a memory, the memory containing firmware comprising machine readable instructions configured to read the mode switch; and when the mode switch is in the auto-takeoff mode, if the FLAP control is set to a particular position, configure the flap servo driver to position flaps at a minimum-lift position so long as a squat switch detects ground contact and airspeed remains below a minimum takeoff airspeed threshold, then upon the squat switch detecting an absence of ground contact and airspeed above the minimum takeoff airspeed, configure the flap servo driver to position the flaps at a low-drag, high-lift, configuration. The machine readable instructions also provide that if the FLAP control is set to any other position, configuring the flap servo driver to position the flaps at a configuration determined by the flap control; and monitor throttle position, and if the throttle is positioned at idle, a Lift Dump switch is activated, and the squat switch detects ground contact, using the flap servo driver to position flaps at a minimum lift setting and using the spoiler drivers to deploy spoilers to a minimum lift position.

In another embodiment, a method of augmenting controls of high aspect ratio aircraft includes reading a mode switch having at least a manual mode, a loiter-cruise mode, and an auto-landing mode; and, when the mode switch is in the manual or loiter-cruise modes, sensing a position of a spoiler lever control through the spoiler control input and driving both a left and a right spoiler servo to a symmetrical position determined by the spoiler control. Also, when the mode switch is in the auto-landing mode, configuring the spoiler drivers to drive the left spoiler servo to a left spoiler position dependent on aileron and throttle position, and the right spoiler servo to a right spoiler position dependent on aileron and throttle position, the left and right spoiler positions differing whenever the aileron position is not centered, and an average of the spoiler positions being more fully deployed when the throttle position is at a low-power setting than when the throttle position is at a high-power setting.

BRIEF DESCRIPTION OF THE FIGURES

FIGS. 3 and 3A are a flowchart of a method for determining desired control surface positions executed by the controller of the system of FIG. 2.

DETAILED DESCRIPTION OF THE EMBODIMENTS

Figure 1:
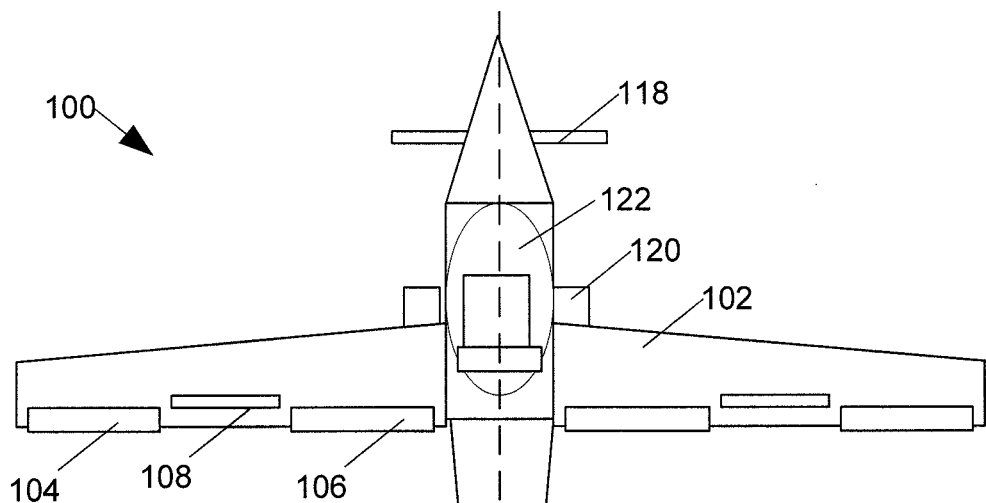
FIG. 1 is a PRIOR ART top plan view of a motorglider aircraft, illustrating typical flight control surfaces.
Figure 2:
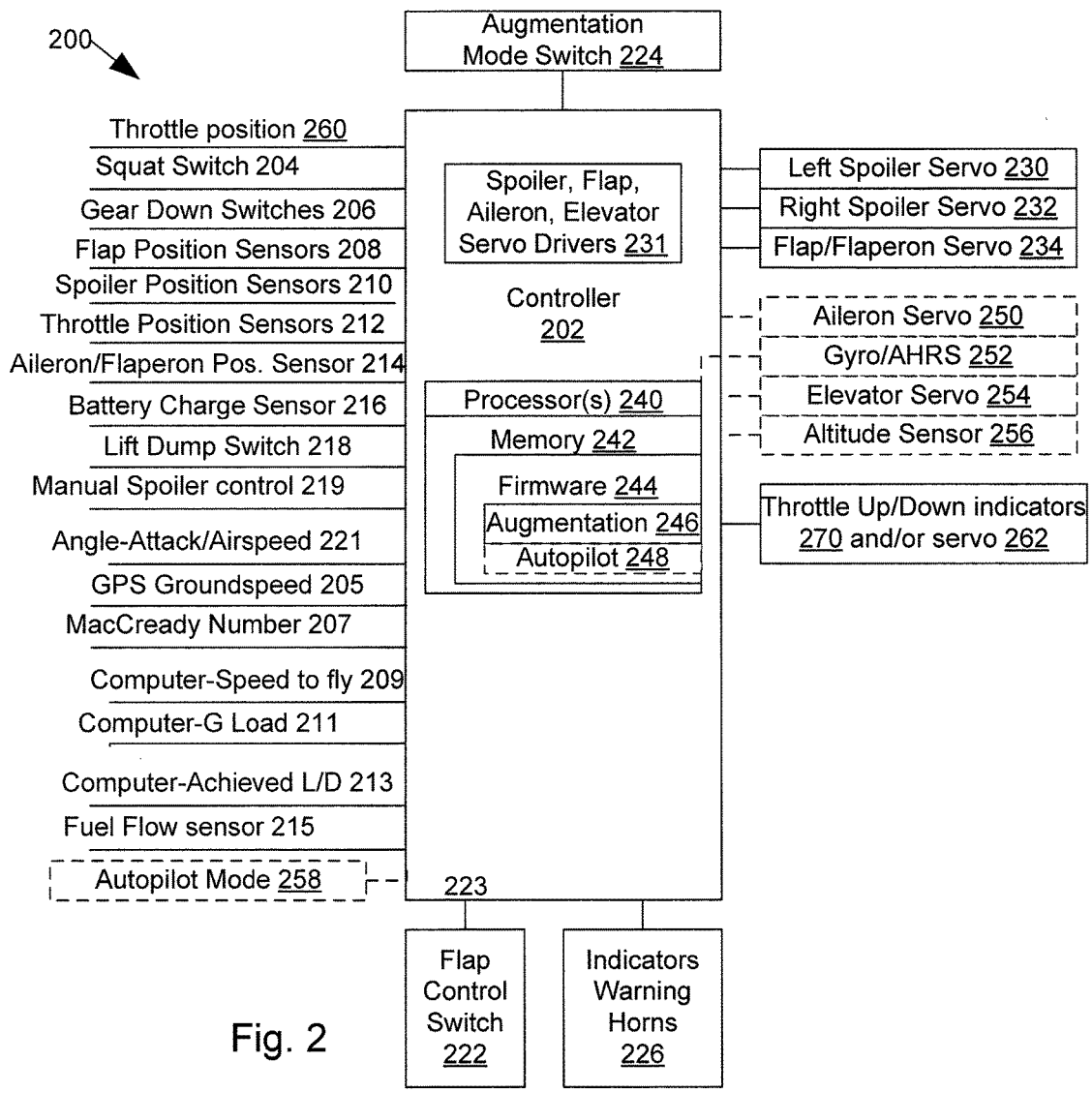
FIG. 2 is a block diagram illustration of a flight-control augmentation and enhancement system.

A flight control augmentation system 200 for use in a motorglider or other high aspect ratio aircraft has a controller 202. Controller 202 receives input signals from one or more squat switches 204, gear-down switches 206, GPS derived ground speed 205, soaring computer derived MacCready number 207, flap position sensors 208, soaring computer derived Speed to Fly (StF) 209, spoiler position sensors 210, soaring computer derived G-Load 211, throttle position sensor 212, Soaring computer derived Achieved L/D 213, aileron position sensor 214, fuel flow sensor 215, a battery charge sensor 216, a lift dump switch 218, a manual spoiler control input 219 typically coupled to a spoiler control lever of the aircraft, a flap setting control 222, in a particular embodiment flap control 222 is a switch, and an augmentation mode switch 224. In some embodiments, certain of these inputs are omitted and a subset of functions provided. In an alternative embodiment, flap setting control 222 is a multiposition lever. Controller 202 is configured with servo drivers 231 coupled to drive and control a left spoiler servo 230, a right spoiler servo 232, and a flap, or in embodiments having flaperons, a flaperon servo 234. In embodiments, an angle-of-attack sensor an airspeed sensor, or both is also provided and is readable by controller 202 through an angle of attack/airspeed sensor input. Controller 202 is configured to calculate and indicate to the pilot a need to change the throttle up or down (or increase/decrease speed during unpowered soaring flight) via a throttle up/down indicator 270, or in embodiments having auto-throttle, with power driving circuitry coupled to drive and control a throttle positioning servo 262. These additional inputs and servos are optional, as indicated by dashed lines in FIG. 2, and are not required for a basic augmentation system.

In some alternative embodiments, the augmentation system may be integrated with autopilot functions, in such alternative embodiments the controller 202 also receives inputs from an autopilot mode switch 258, a gyro or Attitude Heading Reference System (AHRS) 252, and an altitude sensor 256, and is configured to drive and control an aileron servo 250 and elevator servo 254. These additional inputs and servos are optional, as indicated by dashed lines in FIG. 2, and are not required for a basic augmentation system.

Controller 202 has at least one processor 240; processor 240 is associated with a memory system 242 that includes firmware 244. Firmware 244 includes augmentation firmware 246, and in alternative embodiments having autopilot functions, firmware 244 includes autopilot firmware 248. Firmware 244 includes machine readable instructions that, when executed by processor 240, perform functions including reading sensors 205, 207, 208, 209, 210, 211, 212, 213, 214, 215, 216, 220, 221 and switches 222, 218, 206, 204, and control of the throttle command indicator 270 and servos 230, 232, 234 to drive the control surfaces to desired positions, as well as executing the control method of FIG. 3 to determine desired positions for the control surfaces. In an embodiment, position sensors 208, 210, 212, 214 incorporate potentiometers that provide a voltage based on position, and are read through analog-to-digital converters by controller 202.

Flaps control 222 and a manual spoilers control, in an embodiment a lever, are located on the center console, the switch and spoilers lever are coupled to the flaps switch input 223 and the manual spoilers control input 219 respectively of controller 202. Throttle up/down (Speed up/down) command indicator 270 is located on the instrument panel in the view of the pilot and, in some embodiments provides control signals to an auto-throttle system. Lift dump switch 218 is located in an embodiment on a throttle of engine controls associated with the engine of the motorglider. In an alternative embodiment, lift dump switch 218 is located on a control stick, and in another embodiment on a manual spoiler control 219 of the motorglider.

In an embodiment for use with a particular motorglider, Flap Setting control 222 is a six position pre-select switch with settings for −10, −5, 0/AUTO, +5, +10, and +16 degrees; other embodiments for other motorgliders and high aspect ratio aircraft may utilize settings corresponding to different values appropriate for the flight characteristics of those aircraft. The SPOILER control 219 disables automatic operation of the spoilers when set in the DISABLE position, enables automatic operation of the spoilers when set to AUTO, and serves as a variable pre-select lever infinitely variable between a full-retracted position RETRACT (MAN) and a fully extended position EXTEND (MAN), in some embodiments it provides a digital desired-spoiler setting value through an optical encoder, in other embodiments it is a potentiometer that provides a voltage corresponding to a desired spoiler setting, and this voltage is converted to a digital value by an analog-to-digital converter. To avoid accidental actuation of the spoilers, manual spoiler control 219 has locking gates such that moving the control out of the DISABLE, out of AUTO or aft of the RETRACT (MAN) positions requires lifting the control up and over the corresponding locking gate.

In the discussion with reference to FIG. 3, the following are variables in memory 242

RFlap a desired flap angle
RLspoiler a desired setting for the left spoiler
RRspoiler a desired setting for the right spoiler
RSpeed a desired speed In an embodiment, the method 300 of operating the system begins by reading 302 the augmentation mode switch 224, and determining a mode, whether Off 303, Manual 304, Auto-Takeoff 305, Auto-Max Endurance 306, Auto-Max Range 307, Auto-Max Soaring 308, Auto-Landing 309, or Auto-Ground 310.

OFF Mode

If the augmentation mode switch 224 is set to OFF 303, the flap position is set to zero 380 (neutral) and copied into the RFlap register. Similarly, a single spoiler value equal to fully retracted position is set 382 in both RLspoiler and RRspoiler variables. The processor 240 then uses the left spoiler servo 230 to drive 384 the left spoiler to a position designated by RLspoiler, the right spoiler servo 232 to drive the right spoiler to a position designated by RRspoiler, and the flap-flaperon servo 234 to position flaps or flaperons of the motorglider to a position designated by RFlap.

Upon confirmation of spoiler and flap movement by reading Spoiler Position Sensors 212 and Flap Position Sensors 208, respectively, power is removed from the left spoiler servo 230, right spoiler servo 232, flap-flaperon servo 234 and the throttle up/down command indicator 270.

Further use of the flaps and spoilers is disabled while the Augmentation Mode Switch 224 remains in the OFF position.

MANUAL Mode

If the augmentation mode switch 224 is set to MANUAL 304, a flap position value is determined according to the setting of the flap control 222, and copied 314 into the RFlap register. Similarly, a single spoiler value determined according to a position of the spoiler control 219 is determined and set 312 in both RLspoiler and RRspoiler variables.

The processor 240 then uses the servo drivers 231 driving the left spoiler servo 230 to drive 316 the left spoiler to a position designated by RLspoiler, the right spoiler servo 232 to drive the right spoiler to a position designated by RRspoiler, and the flap-flaperon servo 234 to position flaps or flaperons of the motorglider to a position designated by RFlap.

In the MANUAL mode 304, the left and right spoilers operate in unison. A processor of the processors 240, under control of firmware 244, reads position sensors 210 attached to each spoiler to verify extension and retraction, and to detect 318 asymmetric or unequal spoiler deployments; if asymmetric spoiler deployment is detected an error warning is generated and further operation of spoiler servos in a way that could aggravate the asymmetry is suspended. In addition, an error condition is identified by continuously comparing the desired setting RLspoiler/RRspoiler with the actual position detected 210. If the difference between desired setting and actual position exceeds a preset threshold for a predetermined length of time, regardless of whether the mode calls for symmetrical or asymmetrical deployment, a fault condition is identified. Once a fault is detected and annunciated, spoilers are retracted and spoiler control is disabled for the rest of the flight.

Since a common cause of accidents is landing wheels-up, a processor 240, operating under control of firmware 244, reads landing gear position from gear-down switches 206, and sounds a warning horn if the gear is not down and locked and spoilers are not fully retracted.

Processors 240 periodically check Battery Charge Sensor 216 and, executing Firmware 244, if insufficient battery charge is detected, alerts the pilot then performs a safe shutdown.

Automatic Modes

AUTO/TAKEOFF Mode

Taking off in a high aspect ratio aircraft with low wing loading is challenging, especially in gusty conditions and even more so for power pilots new to gliders.

Selecting augmentation AUTO/TAKEOFF mode 305 using mode selector 224 will engage automatic control of the flaps and spoilers.

When the augmentation control is set to AUTO/TAKEOFF, the flaps automatically perform three functions:

1) Enhance roll control during takeoff roll
2) Automatic flap extension at liftoff
3) Lift dump in the event of a rejected takeoff When the augmentation control is set to AUTO/TAKEOFF, the spoilers automatically perform four functions:

1) Improve ground handling prior to the start of the takeoff roll
2) Auto-retraction upon start of takeoff roll
3) Operate as spoilerons for enhanced roll control during the takeoff roll and immediately after liftoff
4) Automatic full deployment for lift-dump in the event of a rejected takeoff These flap and spoiler operations are detailed as follows.

Flaps in Auto/Takeoff Mode

1) Enhance Roll Control During Takeoff Roll

If the FLAP control is set to 0/AUTO, the flaps remain at full negative (UP) position while taxiing into position and during the initial acceleration. Accelerating with the flaps in the negative position increases roll control and keeps aircraft weight on the runway for improved lateral control in spite of gusty conditions.

2) Automatic Flap Extension at Liftoff

Upon liftoff, as determined by a change in status of the Squat Switch 204 from ground (ground contact) to flight (absent ground contact) and above a predetermined indicated airspeed 221, the flaps automatically move to a low-drag, high-lift, configuration. In a particular embodiment for a particular motorglider, upon detection of liftoff when above a minimum takeoff airspeed, which in a particular embodiment is 50 KIAS, the flaps rapidly extend from negative ten degrees up to positive five degrees down. This sudden reconfiguration provides a clear transition from rolling to flying.

This is accomplished by setting 390 an appropriate high-lift, low-drag, flap setting for the takeoff configuration and placing that setting in RFlap 360. In a particular embodiment for use in a particular motorglider, the high-lift, low-drag setting is 5 degrees which also corresponds to the best angle of climb (Vx) setting.

3) Lift Dump in the Event of a Rejected Takeoff

The pilot may initiate a rejected takeoff (RTO) by reducing the throttle to idle and triggering the Lift Dump switch 218 on the throttle. The augmentation controller 202 verifies the aircraft has weight on wheels 342, whereupon the flaps snap from their current position to full up (negative). This is done by setting 392 RFlap to a Full Up value. This will allow safe and reliable rejected takeoff and improved roll-out control in gusty conditions, especially for low time motor glider pilots.

Moving the FLAP control to any position other than 0/AUTO overrides automatic operation. Once moved to any other position, the flaps move to the pre-selected position and stop. If the FLAP control is returned to 0/AUTO, automatic operation of the flaps is reengaged.

Spoilers in Auto/Takeoff Mode

1) Improve Ground Handling Prior to the Start of the Takeoff Roll

Prior to takeoff the augmentation controller confirms taxiing status by verifying ground contact by reading the Squat Switch 204, the throttle setting is below 25% and GPS speed 205 is less than 20 knots whereupon both spoilers are fully extended by setting both RLspoiler and RRspoiler to a full-up value. This will allow safe and reliable ground operations in gusty conditions, especially for low time motor glider pilots.

2) Auto-Retraction Upon Start of Takeoff Roll

Upon sensing a throttle setting 212 above 90%, both spoilers fully retract to improve acceleration and lift. This is done by setting 360 both RLspoiler and RRspoiler to a fully retracted value.

3) Operate as Spoilerons for Enhanced Roll Control During the Takeoff Roll and Immediately after Liftoff L/R spoilers operate independently as spoilerons to augment the ailerons for enhanced roll control during Auto/Takeoff mode until the aircraft accelerates to best climb speed. Since climb rate is at a premium immediately following liftoff, spoileron control is desensitized and only operates when Left/Right aileron control input exceeds 50% as sensed by aileron position sensor 214, whereupon spoiler deployment on the 'down' side to augment aileron control and increase roll response. This is done by computing 334 a left spoiler setting for RLspoiler as a function of the aileron position 214, the spoiler lever 212, and the throttle position sensor 260. Similarly, a right spoiler setting is computed 336 using the same function of aileron position 214, spoiler lever 212, and throttle position 260. Rapid differential spoiler operation in unison with aileron control input will significantly enhance the roll response without additional adverse yaw as the aircraft initially climbs away from the runway.

4) Automatic Full Deployment for Lift-Dump in the Event of a Rejected Takeoff

The pilot may initiate a rejected takeoff (RTO) by reducing the throttle to idle and triggering the Lift Dump switch 218 on the throttle. The augmentation controller verifies the aircraft has ground contact, whereupon both spoilers are fully extended by setting 392 both RLspoiler and RRspoiler to a full-up, minimum-lift, value. This will allow safe and reliable rejected takeoff and improved roll-out control in gusty conditions, especially for low time motor glider pilots.

Once RFlap, RLspoiler and RRspoiler are set, the servos are driven 394 to position the surfaces accordingly.

AUTO/MAX ENDURANCE Mode

When the mode control switch 224 is set to Auto-Max Endurance mode 306, the motorglider performance is optimized for maximum time-duration powered flight by operating at a speed which results in minimum fuel consumption per unit time and minimizing drag consistent with lift and maneuvering requirements. Flap positions are set by fine-tuning flap position for a given weight by monitoring Fuel Flow 215. By finely adjusting flap position to match an optimal deployment schedule, the AUTO/Max Endurance mode reduces fuel burn per unit time and increases maximum endurance. In AUTO/MAX ENDURANCE mode 306, Processor(s) 240 lookup the drag polar resident in memory 242, executes firmware 244 to adjust the drag polar to account for the calculated value of current gross weight and G-Force 211 and determines the speed consistent with the minimum drag and sink rate, loads the resulting optimal speed in RSpeed, compares the current airspeed 221 to RSpeed and, based on the difference, indicates 330 throttle setting tweaks by illuminating the Throttle up/down command 270 accordingly. In an alternate embodiment, RSpeed is determined by firmware 244 by reference to angle-of-attack 220 rather than drag polar.

In AUTO/MAX ENDURANCE mode 306, if the FLAP control is set to 0/AUTO the flaps are controlled automatically by setting RFlap to an optimal flap setting calculated 325 as a function of at least current airspeed and/or angle of attack. In particular embodiments, the calculation of optimum flap setting considers additional parameters such as weight, air temperature, wing contamination, external payload configuration and altitude in addition to airspeed. The flaps are automatically retracted at higher speeds to prevent exceeding flap limitations by setting RFlap to an appropriate value. Moving the FLAP control to any position other than 0/AUTO overrides automatic operation, if the FLAP switch is detected as being in a position other than 0/AUTO; RFlap is set to a value determined from the FLAP switch or control 222 setting. Returning the FLAP control 222 to 0/AUTO reengages automatic control.

When the augmentation mode switch is set to AUTO/MAX ENDURANCE, and manual spoiler control 219 is set to AUTO, the spoilers remain fully retracted unless the SPOILER control is lifted up and over the locking gate by setting 327 RSpoiler=LSpoiler=0. If the SPOILER control is lifted past the locking gate, the spoilers are deployed evenly by setting RSpoiler=LSpoiler and both equal to a value determined from the spoiler control.

The processor 240 then uses the left spoiler servo 230 to drive 329 the left spoiler to a position designated by RLspoiler, the right spoiler servo 232 to drive the right spoiler to a position designated by RRspoiler, and the flap-flaperon servo 234 to position flaps or flaperons of the motorglider to a position designated by RFlap.

In the Auto-Max Endurance mode 306, the left and right spoilers operate in unison. A processor of processors 240, under control of firmware 244, reads position sensors 210 attached to each spoiler to verify extension and retraction, and to detect 318 asymmetric or unequal spoiler deployments; if asymmetric spoiler deployment is detected an error warning is generated and further operation of spoiler servos in a way that could aggravate the asymmetry is suspended.

Since a common cause of landing accidents is the wheels-up landing, a processor of processors 240, operating under control of firmware 244, reads landing gear position from gear-down switches 206, and sounds a warning horn if the gear is not down and locked when other controls are detected as being in a landing configuration. A landing configuration is presumed detected 320 when spoilers are not fully retracted and the Gear Down Switches 206 are selected to the up position.

AUTO/MAX RANGE Mode

When the mode control switch 224 is set to Auto-Max Range mode 307, motorglider performance is optimized for maximum range powered flight by operating at the speed which produces the greatest distance per unit of fuel and minimizing drag consistent with lift and maneuvering requirements. In an embodiment, a processor of processors 240, operating under control of firmware 244, calculates fuel economy by dividing the aircraft's current GPS ground speed 205 by fuel flow 215 to arrive at current fuel economy, this is provided on a display for the pilot to use in selecting an airspeed. Alternatively, a target speed-to-fly, based on current wind conditions at the current location of the aircraft, is read from a soaring computer and set as a target airspeed in RSpeed. Flap positions are set by fine-tuning flap position based upon factors including current airspeed and altitude to yield maximum fuel economy. By finely adjusting flap position to match an optimal deployment schedule, the AUTO/Max Range mode achieves maximum range given the current operating conditions including the effects of headwind/tailwind.

In AUTO/MAX RANGE mode 307, in embodiments having a soaring computer that provides an optimal speed in RSpeed, a processor compares the current airspeed 221 to RSpeed and, based on the difference, illuminates 402 the Throttle up/down command 270 accordingly.

In AUTO/MAX RANGE mode 307, if the FLAP control 222 is set to 0/AUTO the flaps are controlled automatically by setting RFlap to an optimal flap setting calculated 404 as a function of at least current airspeed and/or angle of attack. In particular embodiments, the calculation of optimum flap setting considers additional parameters such as weight, air temperature, wing contamination, external payload configuration, windspeed vector in addition to groundspeed. The flaps are automatically retracted at higher speeds to prevent exceeding flap limitations by setting RFlap to an appropriate value. Moving the FLAP control 222 to any position other than 0/AUTO overrides automatic operation, if the FLAP switch is detected as being in a position other than 0/AUTO; RFlap is set to a value determined from the FLAP control 222 setting. Returning the FLAP control 222 to 0/AUTO reengages automatic control.

When the augmentation mode switch is set to AUTO/MAX RANGE, the spoilers remain fully retracted unless the SPOILER control is lifted up and over the locking gate by setting 406 RSpoiler=LSpoiler=0. If the SPOILER control is lifted past the locking gate, the spoilers are deployed evenly by setting RSpoiler=LSpoiler and both equal to a value determined from the spoiler control.

The processor 240 then uses the left spoiler servo 230 to drive 408 the left spoiler to a position designated by RLspoiler, the right spoiler servo 232 to drive the right spoiler to a position designated by RRspoiler, and the flap-flaperon servo 234 to position flaps or flaperons of the motorglider to a position designated by RFlap.

In the Auto-Max Range mode 306, the left and right spoilers operate in unison. A processor of processors 240, under control of firmware 244, reads position sensors 210 attached to each spoiler to verify extension and retraction, and to detect 318 asymmetric or unequal spoiler deployments; if asymmetric spoiler deployment is detected an error warning is generated and further operation of spoiler servos in a way that could aggravate the asymmetry is suspended.

Since a common cause of landing accidents is the wheels-up landing, a processor of processors 240, operating under control of firmware 244, reads landing gear position from gear-down switches 206, and sounds a warning horn if the gear is not down and locked when spoilers are not fully retracted.

AUTO/MAX SOARING Mode

While many modes herein described, including the Auto-Landing mode, Max Endurance mode, Auto-Ground mode, and Auto-Takeoff mode, are applicable to a wide variety of high aspect ratio aircraft, those high aspect ratio aircraft that are motorgliders may also be operated in soaring flight. During soaring operations, a pilot will typically use the motorglider's engine during takeoff and initial climb, but then shuts off the engine in flight and takes advantage of updrafts, such as those often found upwind of mountain ridges or "thermals" driven by rising warm air, as an energy source.

When the mode control switch 224 is set to Auto-Max Soaring mode 308, motorglider performance is optimized for maximum engine off soaring performance by operating at the Speed to Fly 209 calculated by a soaring computer to achieve minimum sink when in thermalling (turning) flight and the optimal tradeoff between sink and speed in cruising (straight) flight consistent with the selected MacCready number 207. A processor of processors 240, operating under control of firmware 244, reads Speed to Fly 209 supplied by a soaring computer and stores the value in RSpeed. Flap positions are set by fine-tuning flap position to yield maximum soaring performance. By finely adjusting flap position to match an optimal deployment schedule, the AUTO/Max Soaring mode achieves maximum speed/range consistent with the selected MacCready number given the current operating conditions including the effects of headwind/tailwind and vertical motion of the surrounding air. In AUTO/MAX SOARING mode 308, Processor(s) 240 compares the current airspeed 221 to RSpeed and, based on the difference, illuminates the Throttle, or Speed up/down indicators 270 accordingly.

In AUTO/MAX SOARING mode 308, if the FLAP control 222 is set to 0/AUTO the flaps are controlled automatically by setting RFlap to an optimal flap setting calculated 410 as a function of at least current airspeed and/or angle of attack. In particular embodiments, the calculation of optimum flap setting considers additional parameters such as weight, air temperature, wing contamination, external payload configuration in addition to airspeed. The flaps are automatically retracted at higher speeds to prevent exceeding flap limitations by setting RFlap to an appropriate value. Moving the FLAP control 222 to any position other than 0/AUTO overrides automatic operation, if the FLAP switch is detected as being in a position other than 0/AUTO; RFlap is set to a value determined from the FLAP control 222 setting. Returning the FLAP control 222 to 0/AUTO reengages automatic control.

When the augmentation mode switch is set to AUTO/MAX SOARING, the spoilers are held fully retracted unless the SPOILER control is lifted up and over the locking gate by setting 412 RSpoiler=LSpoiler=0. If the SPOILER control is lifted past the locking gate, the spoilers are deployed evenly by setting RSpoiler=LSpoiler, and both RSpoiler and LSpoiler equal to a value determined from the spoiler control 219.

The processor 240 then uses the left spoiler servo 230 to drive 414 the left spoiler to a position designated by RLspoiler, the right spoiler servo 232 to drive the right spoiler to a position designated by RRspoiler, and the flap-flaperon servo 234 to position flaps or flaperons of the motorglider to a position designated by RFlap.

In the Auto-Max Soaring mode 308, the left and right spoilers operate in unison. A processor of processors 240, under control of firmware 244, reads position sensors 210 attached to each spoiler to verify extension and retraction, and to detect 416 asymmetric or unequal spoiler deployments; if asymmetric spoiler deployment is detected an error warning is generated and further operation of spoiler servos in a way that could aggravate the asymmetry is suspended.

Since a common cause of landing accidents is the wheels-up landing, and spoilers are frequently deployed during approaches to landing, a processor of processors 240, operating under control of firmware 244, reads landing gear position from gear-down switches 206, and sounds a warning horn if the gear is not down and locked when spoilers are not fully retracted.

AUTO/LANDING Mode

Landing a high aspect ratio aircraft with low wing loading is challenging, especially in gusty conditions and even more so for power pilots new to gliders.

Selecting augmentation AUTO/LANDING mode 309 will engage automatic control of the flaps and spoilers.

When the augmentation control is set to AUTO/LANDING the flaps automatically perform three functions:

1) Automatic flap deployment in flight,
2) Automatic retraction to reduce drag during go-around
3) Lift-dump upon landing When the augmentation control is set to AUTO/LANDING the spoilers perform four functions:

1) Operation as spoilerons for enhanced roll control
2) Operation coupled to throttle lever for approach glideslope control
3) Auto-retraction on go-around
4) Automatic full deployment for lift-dump upon landing These flap and spoiler operations are detailed as follows.

Flaps in Auto/Landing Mode

1) Automatic Flap Deployment in Flight:

If the FLAP control is set to 0/AUTO, the flaps are deployed automatically to a high-drag, high-lift, configuration consistent with flap-operating airspeed limitations and a landing configuration. In a particular embodiment for a particular motorglider, above 76 KIAS (knots indicated airspeed); the flaps are retracted to zero degrees. Between 75 KIAS and 65 KIAS, the flaps extend according to a schedule, reaching 16 degrees at 65 KIAS and below.

This is accomplished by computing 332 an appropriate high-lift, high-drag, flap setting for the landing configuration as a function of airspeed, and placing that setting in RFlap. In a particular embodiment for a particular motorglider, the high-lift, high-drag setting is 16 degrees.

Moving the FLAP control to any position other than 0/AUTO overrides automatic operation. Once moved to any other position, the flaps move to the pre-selected position and stop. If the FLAP control is returned to 0/AUTO, automatic operation of the flaps is reengaged.

Terminating the Approach and Landing

An approach, using Auto/Landing mode, typically ends in one of three ways, these are detected 340 and appropriate further actions are taken. A go-around maneuver 344 may be performed, where a pilot typically applies full throttle, restarts the engine if the engine is not operating, retracts spoilers, and reduces flap settings while entering a climb, the pilot then typically makes another approach to the same or different runway at the same or a nearby airport. Alternatively, the aircraft may touch down and land 342, which may lead either to a normal rollout where a "lift-dump" may be desired, or to an immediate takeoff in a "touch-and-go" maneuver. Finally, the Auto/Landing mode may be terminated by other conditions 346 such as the pilot setting the mode switch 224 to a different mode. Landing and lift dump 342 is detected by the processor 240 when the squat switch 204 shows ground contact, the throttle position 260 is at or near idle, and a lift-dump switch 218 is pressed.

AUTO FLAP LIFT DUMP AT LANDING: Following approach, flare and touch down the pilot may trigger the Lift Dump switch 218 on the throttle to complete a landing 342. The augmentation controller verifies ground contact using squat switch 204 and verifies the engine throttle is set at idle by reading the throttle position sensor 260, whereupon the flaps snap from full down to full up (negative). This is done by setting 348 RFlap to a Full Up value. This allows safe and reliable landings in gustier conditions, especially for low time motor glider pilots by reducing the likelihood of unexpected liftoff after touchdown.

GO-AROUND AUTO-RETRACT: In the event of a go-around 344, which in a particular embodiment is sensed by finding the throttle position advanced beyond 75%, the controller automatically retracts the flaps, in a particular embodiment to +5 degrees. This is done by setting RFlap to a retracted value consistent with airspeed. Following a go-around, a pilot will probably fly a circuit and attempt another landing. Therefore, so long as the landing gear is extended, reducing power to a setting less than 25% reengages 364 the AUTO-LANDING mode. In a particular embodiment, on detecting go-around when the engine is not operating, the controller 202 restarts the engine of the motorglider or high aspect ratio aircraft.

SPOILERONS in Auto/Landing mode: L/R spoilers operate independently as spoilerons to augment the ailerons for enhanced roll control during Auto/Landing mode prior to detecting 340 an approach termination. Even a modest Left/Right aileron control input as sensed by aileron position sensor 214 produces spoiler deployment on the 'down' side and rapid retraction of the spoiler on the 'up' side. This is done by computing 334 a left spoiler setting for RLspoiler as a function of the aileron position 214, the spoiler lever 212, and the throttle position sensor 260. Similarly, a right spoiler setting is computed 336 using the same function of aileron position 214, spoiler lever 212, and throttle position 260. Rapid differential spoiler operation will significantly enhance the roll response without additional adverse yaw, even into the flare.

GLIDE PATH CONTROL: The L/R spoilers are coupled in unison in response to changes of the Throttle position 260 for direct lift control for precise Glide Slope tracking. At lower power settings, the spoilers are partially deployed, effectively decreasing the lift to drag ratio and presenting a familiar sight picture on final. As the pilot adjusts power on final approach, the spoilers modulate up and down in response to throttle movement, giving the pilot single lever glide path control. Closing the throttle will allow the pilot to increase the rate at which speed bleeds off in the flare and help him safely land in gusty conditions. This is accomplished by including throttle position in spoiler computations 334, 336 such that an average of RLspoiler and RRspoiler remains constant with aileron position changes alone, where RLspoiler and RRspoiler change with aileron position, yet the average of RLspoiler and RRspoiler decreases with advanced throttle position.

With the mode switch is in the Auto/Landing mode, the result is that the controller drives the left spoiler servo to a left spoiler position dependent on aileron and throttle position, and the right spoiler servo to a right spoiler position dependent on aileron and throttle position, the left and right spoiler positions differing whenever the aileron position is not centered, and an average of the spoiler positions being more fully deployed when the throttle position is at a low-power setting than when the throttle position is at a high-power setting. When in landing mode, the throttle-to-spoiler control circuit is active even when the engine is off. This allows consistent "single lever glide path control" whether the engine is running or not. Positioning the Spoiler Control 219 to any position other than AUTO supersedes automatic control and allows direct pilot control, regardless of engine status.

AUTO SPOILER LIFT DUMP UPON TOUCH DOWN: Following approach, flare and touch down the pilot may trigger the Lift Dump switch 218 on the throttle. The augmentation controller verifies the aircraft has landed 342 by reading squat switch or switches 204 and the throttle position 260 is at idle, whereupon both spoilers snap to fully extended by setting both RLspoiler and RRspoiler to a full-up, minimum lift, value. This will allow safe and reliable landings and roll-out in gusty conditions, especially for low time motor glider pilots.

GO-AROUND AUTO-RETRACT: In the event of a go-around 344 advancing the throttle beyond a go-around threshold, which in an embodiment is 75% of full throttle, automatically retracts both spoilers fully; this is done by setting 360 both RLspoiler and RRspoiler to a fully retracted value. Following a go-around, a pilot will probably fly a circuit and attempt another landing. Therefore, so long as the mode selector remains in AUTO/LANDING and manual spoiler control 219 is in AUTO, automatic spoiler control resumes.

After any setting of RLspoiler, RRspoiler, or RFlap, the augmentation controller operates the associated servos to move 338, 352 362 the associated spoiler or flap control surfaces to the indicated position.

Since a common cause of landing accidents is the wheels-up landing, a processor of processors 240, operating under control of firmware 244, reads landing gear position from gear-down switches 206, and sounds a warning horn if the gear is not down and locked when spoilers are deployed.

AUTO/GROUND Mode

Ground operations in a high aspect ratio aircraft with low wing loading is challenging, especially in gusty conditions and even more so for power pilots new to gliders.

Selecting augmentation AUTO/GROUND mode 310 using mode selector 308 will engage automatic control of the flaps and spoilers.

When the augmentation control is set to AUTO/GROUND the flaps and spoilers automatically minimize lift to reduce the effects of gusty wind conditions while engaged in ground operations. In typical embodiments, this is done by deploying spoilers, and raising flaps, when other signals such as the squat switch indicate that the aircraft is confirmed in ground operations.

Flaps in Auto/Ground Mode

If the FLAP control is set to 0/AUTO, the flaps move to and stay at the full negative (UP) position. This is done by the augmentation controller verifying the aircraft has weight on wheels 342 and setting 348 RFlap to a Full Up value. This will allow safe and reliable ground operations in gusty conditions.

Moving the FLAP control to any position other than 0/AUTO overrides automatic operation. Once moved to any other position, the flaps move to the pre-selected position and stop. If the FLAP control is returned to 0/AUTO, automatic operation of the flaps is reengaged.

Spoilers in Auto/Ground Mode

If the SPOILER control is set to AUTO, the spoilers move to and stay at the full extended (UP) position. This is done by the augmentation controller confirming taxiing status by verifying ground contact by reading the Squat Switch 204, the throttle setting is below 25% and GPS speed 205 is less than a maximum expected taxi speed, which in an embodiment is 20 knots, whereupon both spoilers are fully extended by setting both RLspoiler and RRspoiler to a full-up value. This will allow safe and reliable ground operations in gusty conditions, especially for low time motor glider pilots.

It is expected that numerous variations may be implemented with this system. In particular, Applicant notes that, since performance characteristics of aircraft vary, all airspeeds, flap and flaperon deployment schedules, and GPS groundspeeds mentioned herein will be adjusted when the system is adapted for use with aircraft other than the particular motorglider with which the system was first developed.

Where spoiler controls have been referenced as a spoiler lever, spoiler controls known in the art of aircraft include switches, buttons, hydraulic valves, and knobs as well as levers, all provide pilot input indicative of a desired spoiler setting and all of which may be referenced as a spoiler control. Within this document, the term spoiler refers to a retractable device mounted to a wing of an aircraft that has a low-drag retracted position where the wing produces lift normally and has an effective shape smooth on its upper surface, and an extended or deployed position where the device protrudes into air above the wing and acts to increase drag and disturb airflow over the wing, thereby decreasing lift at the same angle of attack. An airbrake resembles a spoiler in that it increases drag when deployed, however airbrakes need not disrupt airflow and decrease lift to the extent that a spoiler does. A typical spoiler as known in the art is a plate that, when deployed, extends above a wing. A spoileron as known in the art is a spoiler that is used for roll control, typically being deployed asymmetrically, such that lift is reduced on the wing being lowered by control movements. When spoilerons are used, the spoiler on the wing being lowered by control movements is deployed to a greater extent than any spoiler on the wing being raised by the same control movements. Spoilerons may be used to supplement ailerons as on airliners like the Boeing 727, typically deploying on the lowered wing having raised ailerons, while ailerons on the opposite wing are lowered to raise the opposite wing, or may replace ailerons entirely as on the B52 bomber.

In many embodiments, lateral direction or bank command inputs are provided to ailerons by a pilot through a yoke, stick, or sidestick, or by an autopilot based upon gyroscope signals, radionavigation signals, remote-control signals, and/or desired headings. These inputs are coupled to the ailerons by cables, pushrods, torque tubes, or hydraulic systems such as are provided in many conventional aircraft; the aileron position sensor of those embodiments may monitor actual aileron positions or may monitor positions of controls coupled to the ailerons.

In alternative embodiments having spoilerons without ailerons, the aileron position sensor is coupled to monitor the bank control inputs directly, and any non-centered bank control input results in a spoiler-servo output in all modes, including cruise-loiter mode.

Similarly, flap selectors may have the form of a lever, a knob, a switch, button, or knob, all of which provide pilot input indicative of a desired flap setting and which may be referenced as a flap selector. Further, the term flap as used herein indicates devices, whether on the trailing edge, or on both the leading and trailing edges, of an aircraft wing that are deployed—such as by extending or lowering to increase camber of the wing, and in some cases to increase area of the wing, to improve lift at low airspeeds. Typically, flaps are retracted or raised to reduce drag at high airspeeds.

The term "squat switch" is used herein to represent any sensor configured to detect that the wheels of retractable landing gear are in contact with ground, whether the sensor is a traditional microswitch configured to detect compression of a strut or spring of the landing gear by aircraft weight, an optical sensor adapted to sense deflection or bending of landing gear components under aircraft weight, or any other sensor adapted to detect ground contact. Squat switches are traditionally provided to prevent gear retraction while an aircraft is sitting on ground, disabling gear retraction when aircraft weight is on the wheels or the wheels are in contact with ground.

Figure 4:
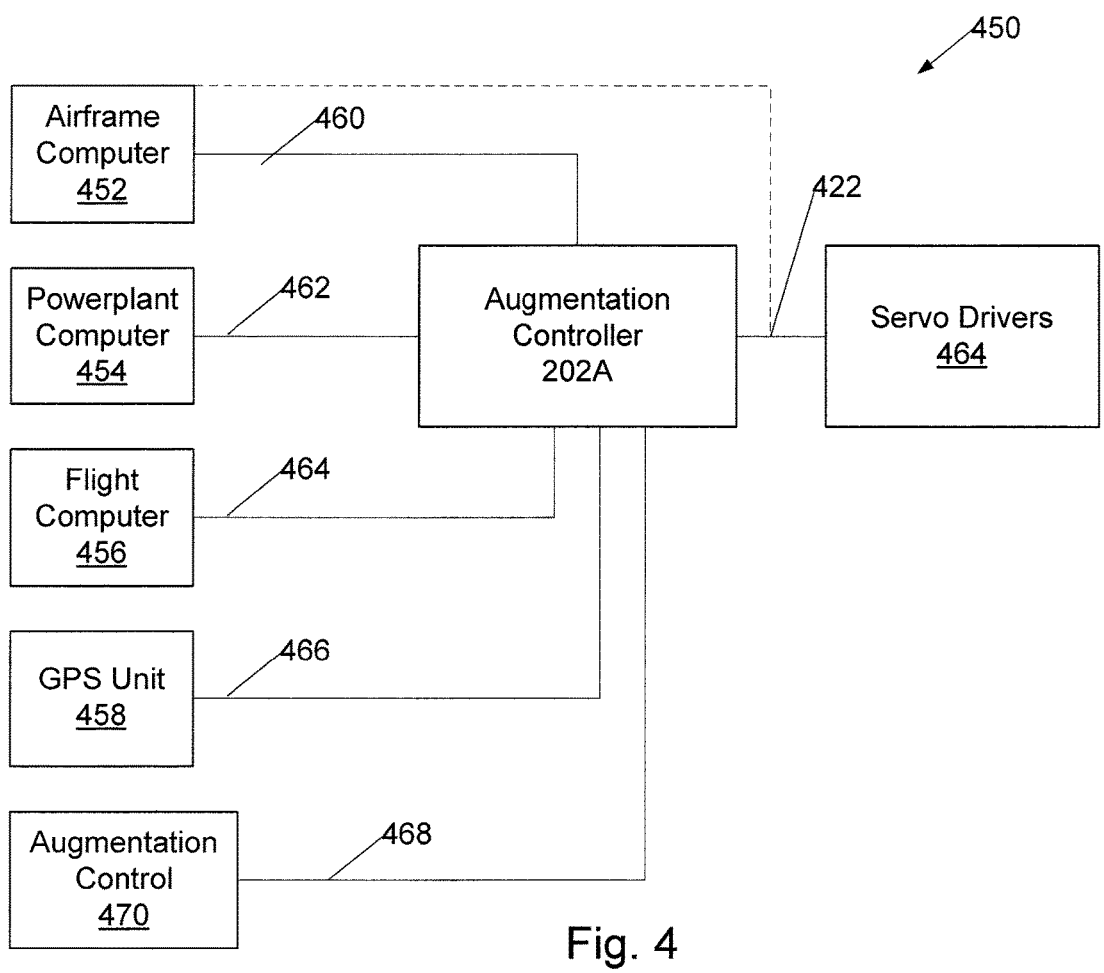
FIG. 4 is a block diagram of an alternative embodiment where multiple inputs to the controller are bundled into serial bus signals.

Any or all of the input signals to controller 202 (FIG. 2), 202A (FIG. 4), may be brought to the controller on one or more serial bus, and any or all of the controller outputs may also be brought out of the controller directly or indirectly to associated servos on a serial bus, which may or may not be the same serial bus as used for one or more of the input signals. In a particular embodiment 450 (FIG. 4), squat switch input 204, gear down switches 206, flap position sensor signals 208, spoiler position signals 210, aileron position sensors 214, and angle of attack or airspeed 221, and flap control input 222 are brought to controller 202A on a serial bus 460 from an airframe computer 452. Similarly, fuel flow 215, and throttle position 212, signals are conveyed to the controller on a multiplexed serial bus 462 from a powerplant computer 454. Similarly, input signals from a flight computer 456, including MacReady number 207, speed to fly 209, G-load 211, and achieved lift to drag 213, are also conveyed to the controller on a multiplexed serial bus 464. Also, GPS groundspeed may be conveyed to the controller on a multiplexed serial bus 466 from a GPS unit 458.

Where controller 202, 202A is panel mounted, the mode switch may be mounted on the controller, in alternative embodiments mode switch input, manual spoiler control input 219, lift dump switch 218 input, and other signals are brought over a serial bus 468 from one or more augmentation control panels 470. Use of serial busses between avionics units is expected to save considerable weight of wiring.

Controller 202A outputs, including left and right flaperon servo signals 230, 232, and flap or flaperon servo 234, may also be combined in a serial bus 462 to a separate set of servo drivers 464, or, in a particular embodiment where servo drivers are included in the airframe computer 452, serial bus 472 is serial bus 460 and these outputs are conveyed to airframe computer 452.

Serial busses 472, 468, 464, 466, 462, 460 may, in some embodiments, be duplicated for enhanced reliability. Further, in some embodiments serial busses 472, 468, 466, 462, 460 may be combined into fewer busses, or individual signals may be shifted from one bus named herein to another of the serial buses, without departing from the intent of this document. Serial busses as described herein may be implemented either using serially encoded signals on electrical connections, whether on twisted pair, shielded cable, or other forms of electrical interconnect, or on optical interconnect such as fiber optic cable.

In this document the term "A directly coupled to B" shall exclude the use of a serial bus to couple A and B, the term "A serially coupled to B" shall require signals between A and B be transmitted over a serial bus, and the term "A coupled to B" shall include any combination of direct and serial couplings, as well as other forms of couplings.

In this document, a switch disclosed as having particular positions includes selections made from a menu of modes, where each mode of the menu corresponds to a position of those positions, where the menu of modes is displayed on an electronic display by a processor.

Combinations

Any combination of the modes herein described may be present in an individual system, with any one or more of the modes omitted depending upon an intended mission profile for the aircraft. In particular some combinations anticipated include:

A control augmentation system designated A and adapted for use in high aspect ratio aircraft including left spoiler, right spoiler, and flap or flaperon, servo drivers. The system has aileron and throttle position sensors; a spoiler control input and a flap selector; and a mode switch or a mode menu having at least a manual mode, and an auto-landing mode. A controller of the system is coupled to control the spoiler and flap servos, the controller coupled to read the aileron and throttle position sensors and the mode switch, and includes at least one processor having a memory, the memory containing firmware, the firmware includes machine readable instructions configured to read the mode switch; and when the mode switch is in the manual mode, sense a position of a spoiler control through the spoiler control input and configure the left and right spoiler servo drivers to drive both left and right spoilers to a symmetrical position determined by the spoiler control. The firmware also includes instructions to, when the mode switch is in the auto-landing mode, configure the spoiler drivers to drive the left spoiler servo to a left spoiler position dependent on aileron and throttle position, and the right spoiler servo to a right spoiler position dependent on aileron and throttle position, the left and right spoiler positions differing whenever the aileron position is not centered, and an average of the spoiler positions being more fully deployed when the throttle position is at a low-power setting than when the throttle position is at a high-power setting.

A system designated AA, including the system designated A, wherein the controller has firmware configured to, when the mode switch is in the auto-landing mode, configure flap position according to a function of airspeed as appropriate for landing.

A system designated AB, including the system designated A or AA, further includes a squat switch configured to sense ground contact with landing gear; and a lift-dump switch configured for manual activation, both the squat switch and the lift-dump switch are coupled to provide signals to the controller. In this system, the firmware further includes machine readable instructions operable in the auto-landing mode and configured to drive the flap servo to a flaps-up position and both the right and left spoiler servos to a fully deployed position when the lift dump switch is activated, the squat switch senses ground contact, and the throttle is at a low-power setting.

A system designated AC, including the system designated A, AA, or AB wherein the mode switch has an auto-takeoff position, and wherein the firmware of the controller includes machine readable instructions adapted to, when the mode switch is in the auto-takeoff position: if the flap control is set to a particular position, configure the flap servo driver to position flaps at a minimum-lift position so long as a squat switch detects ground contact and airspeed remains below a minimum takeoff airspeed threshold, then upon the squat switch detecting an absence of ground contact and airspeed above the minimum takeoff airspeed, configure the flap servo driver to position the flaps at a low-drag, high-lift, configuration; and if the flap control is set to any other position, configure the flap servo driver to position the flaps at a configuration determined by the flap control. The firmware also includes instructions operable during auto-takeoff mode that monitor throttle position, and if the throttle is positioned at idle, a Lift Dump switch is activated, and the squat switch detects ground contact, to use the flap servo driver to position flaps at a minimum lift setting and using the spoiler drivers to deploy spoilers to a minimum lift position.

A system designated AD, including the system designated A, AA, AB, or AC wherein the mode switch has an Auto-Max Endurance position, and wherein the firmware includes machine readable instructions adapted to: when the mode switch is in the auto-max endurance position, read airspeed and/or angle of attack, determine an optimum flap setting therefrom, and, if the flap control is set to a particular position, configure the flap servo driver to position the flaps at the optimum flap setting; when the mode switch is in the auto-max endurance position, determine an optimum power setting, compare throttle position to the optimum setting, and provide throttle adjustment guidance to a pilot when the throttle position is not at the optimum setting; and when the augmentation mode switch is in the auto-max endurance position, use the spoiler servo drivers to position the spoilers at a fully retracted position unless commanded otherwise by a position of the spoiler switch, whereupon the spoiler servo drivers are configured to deploy both left and right spoilers evenly and sound a warning horn if the gear is not down and locked when flaps and spoilers are detected as being in landing configuration.

A system designated AE, including the system designated A, AA, AB, AC, or AD, wherein the mode switch has an auto-ground position, and wherein the firmware of the controller includes machine readable instructions adapted to, when the mode switch is in the auto-ground position: when weight is on the landing gear and a flap control switch is in a particular position, configure the flap servo driver to raise flaps to a position suitable for ground operations; and when weight is on the landing gear and groundspeed less than a maximum taxi speed, drive both left and right spoiler servos to a fully-deployed position.

A system designated AF, including the system designated A, AA, AB, AC, AD, or AE, installed within and coupled to control a high aspect ratio aircraft.

A method designated B of augmenting controls of high aspect ratio aircraft includes reading a mode switch having at least a manual mode, a loiter-cruise mode, and an auto-landing mode; and when the mode switch is in the manual or loiter-cruise modes, sensing a position of the a spoiler lever control through the spoiler control input and driving both a left and a right spoiler servo to a symmetrical position determined by the spoiler control. Further, when the mode switch is in the auto-landing mode, configuring the spoiler drivers to drive the left spoiler servo to a left spoiler position dependent on aileron and throttle position, and the right spoiler servo to a right spoiler position dependent on aileron and throttle position, the left and right spoiler positions differing whenever the aileron position is not centered, the positions such that an average of the spoiler positions is more fully deployed when the throttle position is at a low-power setting than when the throttle position is at a high-power setting.

A method designated BA including the method designated B, wherein, when the mode switch is in the auto-landing mode, the method includes configuring flap position according to a function of airspeed as appropriate for landing.

A method designated BB including the method designated B, or BA, further including, when the mode switch is in the auto-landing mode, driving the flap servo to a flaps-up position and both the right and left spoiler servos to a fully deployed position when a lift dump switch is activated, the squat switch senses ground contact, and the throttle is at a low-power setting.

A method designated BC including the method designated B, BA, or BB wherein the mode switch has an auto-ground position, and wherein, when the mode switch is in the auto-ground position: when weight is on the landing gear and a flap control switch is in a particular position, configuring the flap servo driver to raise flaps to a low-lift position suitable for ground operations; and when weight is on the landing gear and groundspeed less than a maximum taxi speed, driving both left and right spoiler servos to a fully-deployed position.

A method designated BD including the method designated B, BA, BB, or BC, wherein the mode switch has an auto-takeoff position, and when the mode switch is in the auto-takeoff position: if the flap control is set to a particular position, configuring the flap servo driver for flaps at a minimum-lift position so long as a squat switch detects ground contact or airspeed remains below a minimum takeoff airspeed threshold, then upon the squat switch detecting absence of ground contact and airspeed above the minimum takeoff airspeed, configuring the flap servo driver to position the flaps at a low-drag, high-lift, configuration; and if the flap control is set to any other position, configuring the flap servo driver to position the flaps at a configuration determined by the flap control; and monitoring throttle position, and if the throttle is positioned at idle, a Lift Dump switch is activated, and the squat switch detects ground contact, using the flap servo driver to position flaps at minimum lift and using the spoiler drivers to deploy spoilers to a minimum lift position.

A method designated BE including the method designated B, BA, BB, BC, or BD, wherein the mode switch has an Auto-Max Endurance position, and when the mode switch is in the Auto-Max Endurance position: reading airspeed and/or angle of attack, determining an optimum flap setting therefrom, and, if the flap control is set to a particular predetermined position, configuring the flap servo driver for flaps at the optimum flap setting; determining an optimum power setting, comparing throttle position to the optimum setting, and providing throttle adjustment guidance when throttle is not at optimum; and using the spoiler servo drivers fully retracted the spoilers unless commanded otherwise by a setting of a spoiler control, whereupon configuring both left and right spoilers drivers to deploy spoilers evenly and sound a warning horn if the gear is not down and locked when flaps and spoilers are in landing configuration.

A method designated BF including the method designated B, BA, BB, BC, BD, or BE, wherein the mode switch has an Auto-Max Soaring position, and when the mode switch is in the Auto-Max Soaring position: reading an actual airspeed, calculating an optimum flap position for soaring performance from the actual airspeed, and, if a flap control is in an automatic position, configuring the flap servo for that optimum flap position; determining a Speed to Fly, comparing the actual airspeed to the Speed to Fly, and providing a speed increase or speed decrease indication to a pilot.

A method designated BG including the method designated B, BA, BB, BC, BD, BE, or BF, wherein the mode switch has an Auto-Max Range position, and when the mode switch is in the Auto-Max Range position: if the flap control is set to automatic, controlling flap setting by configuring the flap servo according to a function of at least current airspeed and/or angle of attack configured for lowest drag consistent with sustained flight at the current airspeed, and if the flap control is set to any position other than automatic, configuring the flap servo according to a function of the flap control setting; if the SPOILER control is set for a nonzero setting, configuring the left and right spoiler servo drivers in unison, and sounding an alarm if the gear is not down and locked.

A method designated BH, including the method designated BG, further including determining an optimum airspeed for maximum range, comparing the optimum airspeed to a current airspeed, and providing a speedup or slowdown indication to a pilot when the current airspeed differs from the optimum airspeed.

A method designated BI, including the method designated BG, further including determining a fuel economy from fuel consumption and groundspeed, and providing a display of the fuel economy.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A method of augmenting controls of high aspect ratio aircraft comprising:
    reading a mode switch having at least a manual mode, a loiter-cruise mode, and an auto-landing mode;
    when the mode switch is in the manual or loiter-cruise modes, sensing a position of a spoiler control and driving both a left and a right spoiler servo to position left and right spoilers at a symmetrical position determined by the spoiler control;
    when the mode switch is in the auto-landing mode, configuring the left spoiler servo to a left spoiler position dependent on aileron and throttle position, and the right spoiler servo to a right spoiler position dependent on aileron and throttle position, the left and right spoiler positions differing whenever the aileron position is not centered, and an average of the left and right spoiler positions being an average spoiler position representing more fully deployed left and right spoilers when the throttle position is at a low-power setting than an average spoiler position when the throttle position is at a high-power setting.

2. The method of claim 1, further comprising:
    when the mode switch is in the auto-landing mode, configuring flap position according to a function of airspeed as appropriate for landing.

3. The method of claim 1, further comprising:
    when the mode switch is in the auto-landing mode, driving a flap servo to position flaps in a flaps-up position and both the right and left spoiler servos to a fully deployed position when a lift dump switch is activated, a squat switch senses ground contact, and the throttle position is at a low-power setting.

4. The method of claim 1, wherein the mode switch has an auto-ground position, and wherein, when the mode switch is in the auto-ground position:
    when a squat switch senses ground contact and a flap control switch is in a particular position, automatically configuring a flap servo to raise flaps to a low-lift position suitable for ground operations; and
    when the squat switch senses ground contact and groundspeed is less than a maximum taxi speed, driving both left and right spoiler servos to a fully-deployed position.

5. The method of claim 1 wherein the mode switch has an auto-takeoff position, and when the mode switch is in the auto-takeoff position:
    if a flap control switch is set to a particular position, configuring a flap servo to position flaps at a minimum-lift position so long as a squat switch detects ground contact and airspeed remains below a minimum takeoff airspeed threshold, then upon the squat switch detecting an absence of ground contact and airspeed above the minimum takeoff airspeed, configuring the flap servo to position the flaps at a low-drag, high-lift, configuration; and
    if the flap control switch is set to any other position, configuring the flap servo to position the flaps at a configuration determined by the flap control switch; and
    monitoring throttle position, and if the throttle is positioned at idle, a Lift Dump switch is activated, and the squat switch detects ground contact, using the flap servo to position flaps at a minimum lift setting and using the left and right spoiler drivers to deploy the left and right spoilers to a minimum lift position.

6. The method of claim 5, wherein the mode switch has an auto-ground position, and wherein, when the mode switch is in the auto-ground position:
    when the squat switch senses ground contact and the flap control switch is in a particular predetermined position, configuring the flap servo to raise flaps to a low-lift position suitable for ground operations; and
    when the squat switch sense ground contact and groundspeed is less than a maximum taxi speed, driving both left and right spoiler servos to a fully-deployed position.

7. The method of claim 5, wherein the mode switch has an Auto-Max Endurance position, and wherein the method further comprises:
    when the mode switch is in the auto-max endurance position, read airspeed and/or angle of attack, determining an optimum flap setting therefrom, and, if the flap control switch is set to a particular position, configuring the flap servo to position the flaps at the optimum flap setting;
    when the mode switch is in the auto-max endurance position, determining an optimum power setting, comparing throttle position to the optimum power setting, and providing throttle adjustment guidance to a pilot when the throttle power position is not at the optimum setting; and when the mode switch is in the auto-max endurance position, using the left and right spoiler servo drivers to position the left and right spoilers at a fully retracted position unless commanded otherwise by a position of a spoiler switch, whereupon the spoiler servo drivers are configured to deploy both left and right spoilers evenly and sound a warning horn if retractable landing gear is not down and locked when flaps and the left and right spoilers are detected as being in landing configuration.

8. The method of claim 1, wherein the mode switch has an Auto-Max Endurance position, and wherein the method further comprises:

when the mode switch is in the auto-max endurance position, read airspeed and/or angle of attack, determining an optimum flap setting therefrom, and, if a flap control switch is set to a particular position, configuring a flap servo driver to position the flaps at the optimum flap setting;

when the mode switch is in the auto-max endurance position, determining an optimum power setting, comparing throttle position to the optimum power setting, and providing throttle adjustment guidance to a pilot when the throttle power position is not at the optimum power setting; and when the mode switch is in the auto-max endurance position, using the spoiler servo drivers to position the left and right spoilers at a fully retracted position unless commanded otherwise by a position of a spoiler switch, whereupon the spoiler servos drivers are configured to deploy left and right spoilers evenly and sound a warning horn if retractable landing gear is not down and locked when flaps and the left and right spoilers are detected as being in landing configuration.

9. The method of claim 1, wherein the mode switch has an auto-ground position, and wherein, when the mode switch is in the auto-ground position:

when a squat switch senses ground contact and a flap control switch is in a particular predetermined position, configuring a flap servo to raise flaps to a low-lift position suitable for ground operations; and when the squat switch sense ground contact and groundspeed is less than a maximum taxi speed, driving both left and right spoiler servos to a fully-deployed position.

* * * * *